United States Patent [19]
Arena

[11] Patent Number: 5,098,043
[45] Date of Patent: Mar. 24, 1992

[54] INTEGRATED POWER HINGE ACTUATOR

[75] Inventor: Aldo Arena, Smithtown, N.Y.

[73] Assignee: Grumman Aerospace Corporation, Bethpage, N.Y.

[21] Appl. No.: 485,541

[22] Filed: Feb. 27, 1990

[51] Int. Cl.⁵ ............................................. B64C 9/02
[52] U.S. Cl. ............................... 244/215; 244/75 R
[58] Field of Search ............ 244/213, 214, 215, 75 R, 244/78, 90 R

[56]  References Cited
U.S. PATENT DOCUMENTS

| | | |
|---|---|---|
| 2,422,035 | 6/1947 | Noyes, Jr. |
| 3,166,274 | 1/1965 | Messerschmitt ................. 244/75 R |
| 4,172,575 | 10/1979 | Cole |
| 4,312,486 | 1/1982 | McKinney ........................ 244/215 |
| 4,426,911 | 1/1984 | Robinson et al. ............... 244/75 R |
| 4,497,461 | 2/1985 | Campbell .......................... 244/75 R |
| 4,575,027 | 3/1986 | Cronin |
| 4,605,187 | 8/1986 | Stephenson |
| 4,763,862 | 8/1988 | Steinhauer et al. |
| 4,779,822 | 10/1988 | Burandt et al. |

Primary Examiner—Galen Barefoot
Attorney, Agent, or Firm—Pollock, VandeSande & Priddy

[57]  ABSTRACT

A rotary vane or geared rotary actuator housing is located within the interior space of a fixed aircraft wing section, forwardly of the rear spar. The actuator movable arm extends downwardly through the wing and articulates to a push rod which is pivotally connected to a movable control surface hinge fitting. A second fixed hinge fitting is connected to the rear spar, in the interior space of the fixed wing section. When the actuator operates, the arm is rotated thereby causing movement of the push rod and rotation of the control surface hinge fitting relative to the fixed hinge fitting. This results in deflection of the control surface. Location of the actuator housing forwardly of the rear spar and well forward of the hinge enables a designer to use larger and more powerful actuators since the forward end portion of the wing has greater interior volume than the hinge area. Control and power source lines are located within the wing section for protection. Further, control and power source components can be located in an area of the wing that allows integration of these components with the power hinge portion of the actuator into one line replaceable item.

4 Claims, 3 Drawing Sheets

INTEGRATED POWER HINGE ACTUATOR

FIELD OF THE INVENTION

The present invention relates to actuating devices for control surfaces of aircraft, and more particularly to a novel hinge actuator for such control devices.

BACKGROUND OF THE INVENTION

Power hinge actuators are devices utilized to actuate control surfaces on aircraft. To date, power hinge actuators derive their name from the way they are utilized; that is, they are mounted on the surface hinge line between a main aircraft structure and a rotatable control surface.

Mechanical rotary geared actuators receive power from electro-hydraulic power drive units via drive shafts. Hydraulic rotary vane actuators receive power from remote hydraulic servovalves. The disadvantage of locating power hinge actuators at the hinge line is that structural limitations do not permit adequate space to integrate the actuator with the associated power source. Further, a problem exists for wing control surface hinge actuators due to the fact that the wing structures are becoming thinner causing correspondingly thinner aerodynamic envelopes. Accordingly, if an actuator is to be mounted internally of the wing structure, there is a severely limited space available. Thus, the torque-generating capability of such actuators is severely limited. If larger linear actuators are to be mounted externally of the wing, they present a frontal area which extends beyond the aerodynamic envelope of the wing and, therefore, produce undesirable drag. Further, externally mounted actuators require connected control and power lines to be exposed which presents a potentially damaging situation.

BRIEF DESCRIPTION OF THE INVENTION

The present invention utilizes existing mechanical rotary geared or hydraulic rotary vane technology but with an improvement in the location as well as the means of mounting such actuators to the control surface of an aircraft. By permitting more of the aerodynamic envelope to be available for an actuator, the rotary vane or rotary gear device being used may become integrated with the actuator power and control source, thereby forming a single line replaceable item.

Furthermore, the actuator of the present invention is moved to an area of the wing surface which permits design of a larger, and hence more weight efficient, actuator. The main actuator unit of the present invention is contained within the aircraft structure, such as a wing, while a push rod connected between the actuator and the control surface, is mounted below the wing. The presence below the wing of only the push rod and drive cranks creates a frontal area that is minimal compared to classic externally mounted hydraulic actuators. Accordingly, the aerodynamic drag of the present invention is reduced.

The present invention for instance offers the benefit of mounting the actuator on the forward-facing flanges of the wing rear spar, leaving the area of the hinge line relatively unencumbered by actuation devices, thereby allowing freedom to optimize the hinge line area structurally. A further benefit of mounting the actuator as mentioned is that the capability of providing separate and distinct power sources to improve system survivability is facilitated.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
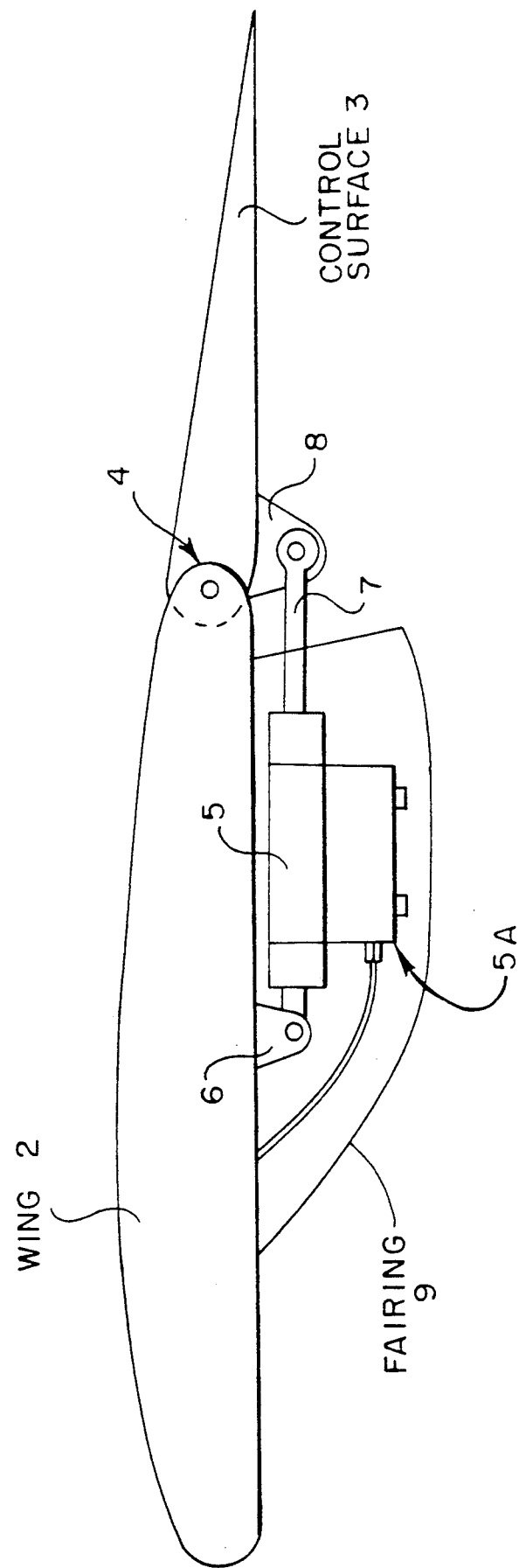
FIG. 1 is a schematic representation of a conventional hydraulic aircraft control surface actuator.

Referring to the figures, and more particularly to FIG. 1 thereof, a schematic illustration of a conventional control surface actuator is illustrated. The wing 2 is seen to extend outwardly to a control surface 3, namely an elevon. A mounting flange 6 extends downwardly from the wing 2 while a second flange 8 extends downwardly from the control surface 3. The control surface 3 is rotatable, relative to the fixed wing 2, by virtue of the hinge 4 existing therebetween. A hydraulic cylinder 5 serves as the hinge actuator for causing rotation of the control surface 3. However, an electromechanical actuator could be used if a particular load level permits. An electro-hydraulic servo-valve package 5A cooperates with and is attached to the cylinder 5 to achieve controlled actuation. The left illustrated end of the hydraulic cylinder is connected to the wing flange 6. The cylinder push rod 7 is pivotally mounted at its end to the control surface flange 8. When the push rod is retracted toward the cylinder, the control surface 3 will rotate downwardly about the hinge 4. The hinge 4 forms an extended structural connection between confronting surfaces of the wing and the control surface 3. Typically, a number of hydraulic cylinders 5 will be mounted perpendicularly to the hinge line to provide sufficient torque for rotating the control surface 3 under load. A fairing 9 encloses the hydraulic cylinder 5 and typically protrudes below the aerodynamic envelope of the wing. The purpose of the fairing is to minimize drag by providing a smooth aerodynamic surface around the illustrated hinge actuator.

The primary problem incident to the utilization of such classic hydraulic cylinders is the trend, in modern aircraft design, toward thinner more stream-lined wing structures and commensurate thin aerodynamic envelopes. Thus, there are severe limitations on the size of such cylinders that may be mounted to an aircraft wing and still develop the necessary torque for proper hinge actuation.

Figure 2:
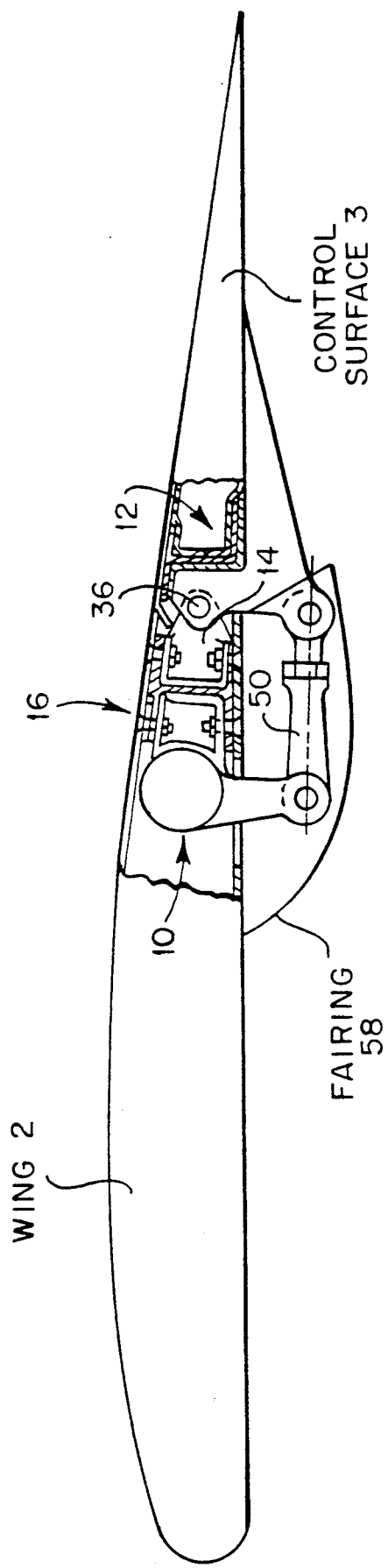
FIG. 2 is an overall cut-away view of the present invention installed between a wing and control surface.

FIG. 2 illustrates the present invention wherein a substantial portion of the hinge actuator capable of existing mostly within the aerodynamic envelope is contained within the wing while only a thin push rod and crank extend underneath the wing.

Referring to FIG. 2 an actuator generally indicated by reference numeral 10 is seen to be mounted within the interior of a wing structure. The actuator may be of a rotary vane type or geared rotary actuator type. The actuator is physically located in the interior of the fixed main portion of a wing and its purpose is to cause rotation of a control surface such as an elevon 12 which is hinged to the main wing section 16. The hinge pin which defines the hinge line between the elevon and the main wing section is indicated by reference numeral 36.

Figure 3:
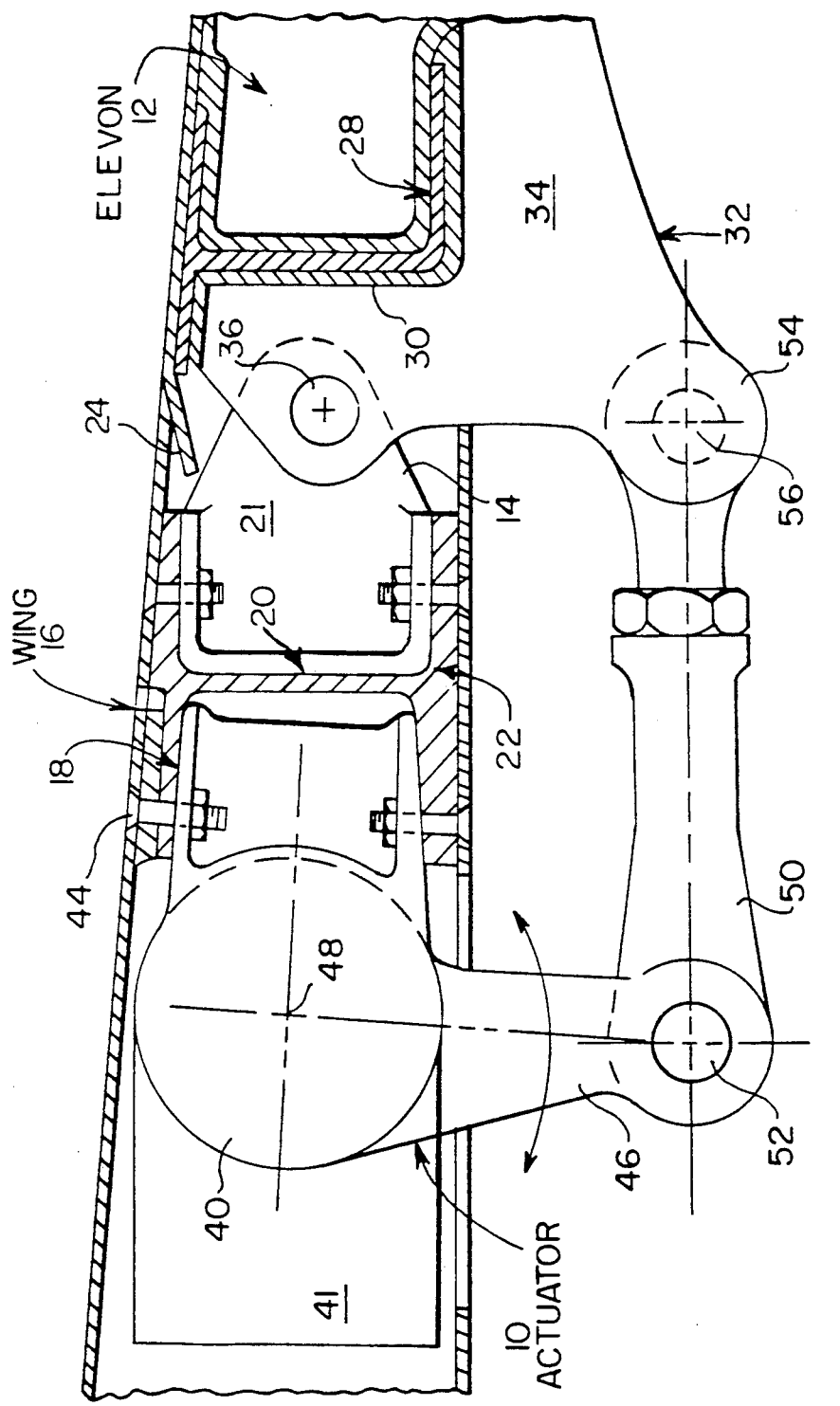
FIG. 3 is a partial cut-away side elevational view of the present invention.

The hinge structure is more particularly seen in FIG. 3 to include a hinge fitting 14 which includes a main lug 21 appending to a web 20. The fitting 14 is secured to the rear spar 22. A second hinge fitting is generally indicated by reference numeral 32 and this second fitting is connected to the control surface or elevon 12. More particularly, the second hinge fitting 32 includes a crank 34 which appends to a web 30. The web 30 is appropriately connected to the structural spar or box 28 which structurally defines the interior of the elevon 12. The purpose of the actuator 10 is to rotate the hinge fitting 32, relative to the fixed hinge fitting 14 about the hinge pin 36. When the elevon 12 is rotated relative to the main wing section 16, a space becomes exposed above the hinge pin 36; and in order to minimize air leakage, a seal 24 is positioned thereat.

A more comprehensive discussion of the actuator 10 will now be offered. The actuator may, by way of example, have a generally cylindrical housing 40 having an axis 48 generally maintained in perpendicular relationship with hinge line 36. The housing 40 extends to a flange 18 which becomes appropriately connected to the rear spar 22 by means of suitable fasteners such as 44. By mounting the actuator forwardly of the rear spar web 20, it is possible to enclose a larger and more powerful actuator since the location is in an area of the wing which offers greater volume. In addition, design of the wing may be optimized since the actuator is physically moved away from the hinge line where a great many structural components are located. The actual type of actuator used, whether rotary vane or geared rotary, is anticipated as being conventional. Accordingly, the control and supply lines to the actuator are not illustrated within the interior space of the main wing section 16. It should, however, be noted that, since these lines are located in the interior of the wing, they are protected from the elements and offer greater design flexibility to create systems separation and reduce the probability of damage in the event the aircraft is a combat aircraft.

The increased available volume in this area of the wing further permits the integration of control and power source components into a single line replaceable package. Thus, housing 41 (FIG. 3) may extend from housing 40 and include conventional components including control components, as well as failure detection and protection components; or as is the case with conventional electro-hydrostatic devices, housing 40 may include components to convert electrical to hydraulic power.

An inventive aspect of the invention is the inclusion of the actuator within the main wing section 16 while the location of the actuator movable arm 46 is outside the wing section. The movable arm 46 rotates about the actuator axis 48 and may, in fact, be two parallel arms if the actuator is a mechanically driven type, such as a geared rotary actuator. The arm 46 extends to a perpendicularly oriented push rod 50 via a pivot connection 52. The push rod exists in generally parallel orientation to the underside of the wing. An outward end of the push rod 50 terminates in a clevis 54 for pivotally mounting the push rod to the elevon hinge fitting 32 by means of a pivot pin 56.

In operation, when actuator 10 is actuated, the arm 46 rotates causing articulated movement of push rod 50. This then imparts rotation of the elevon hinge fitting 32 relative to the fixed hinge fitting 14 resulting in the upward or downward deflection of the elevon 12.

A fairing 58 is employed to minimize drag but its profile is advantageously less than its prior art counterpart in FIG. 1.

The discussion has thus far explained the structure and operation for an actuator 10. However, a plurality of spaced actuators and associated connections exist along the hinge line to evenly distribute actuator forces on the elevon.

By virtue of the aforementioned discussion, it will be appreciated that the present actuator configuration optimizes the design capabilities for control surface hinge actuation and wing structural design in modern aircraft.

It should be understood that the invention is not limited to the exact details of construction shown and described herein for obvious modifications will occur to persons skilled in the art.

I claim:

1. A power hinge actuator assembly for an aircraft control surface comprising:
    a fixed aircraft structure having space in the interior thereof;
    a single rotary power actuator located in the interior space and having a first end of a movable output arm connected to and extending outwardly from the actuator for rotation about a first axis;
    hinge means pivotally connecting the control surface to the fixed aircraft structure;
    a push rod located externally of the aircraft structure and pivotally connected at a first end to the arm for pivotal rotation about a second axis parallel to the first, a second end being pivotally connected to the control surface and pivotally rotatable about a third axis parallel to the first axis;
    wherein movement of the actuator arm causes linked deflection of the control surface.

2. The structure set forth in claim 1 wherein the hinge means comprises:
    a first fitting connected to the structure;
    a second fitting connected to the control surface; and
    a member connecting the first and second fittings, the member defining the hinge line of the control surface.

3. The structure set forth in claim 1 wherein the push rod is located within the aerodynamic envelope of the structure.

4. A power hinge actuator assembly for an elevon which deflects relative to a fixed wing section, the assembly comprising:
    a plurality of individual rotary actuators located within the wing section and forward of a wing rear spar; each actuator having associated therewith
    a first hinge fitting attached internally to the rear spar of the fixed wing section;
    a second hinge fitting attached internally to a structural box of the elevon;
    a push rod located outside the wing section and pivotally connected at a first end to a movable arm of the actuator, the arm rotatable about a first axis and the first push rod end pivotally rotatable about a second axis parallel to the first axis, a second end of the push rod being pivotally connected to the second hinge fitting and pivotally rotatable about a third axis parallel to the first axis, the push rod existing within an aerodynamic envelope of the wing section; and
    a hinge pin pivotally connecting the hinge fittings and coaxially located along a hinge line between the elevon and the wing section.

* * * * *